2 Sheets--Sheet 1.

J. SWAN.

Improvement in Machines for Bending the Lips of Auger Bits.

No. 4,517. Reissued August 15, 1871.

Witnesses:

John Booker
Alex T. Roberts

Inventor:

PER J. Swan
Munn & Co
Attorneys.

AM. PHOTO-LITHOGRAPHIC CO., N.Y. (OSBORNE'S PROCESS.)

2 Sheets--Sheet 2.
J. SWAN.
Improvement in Machines for Bending the Lips of Auger Bits.
No. 4,517. Reissued August 15, 1871.
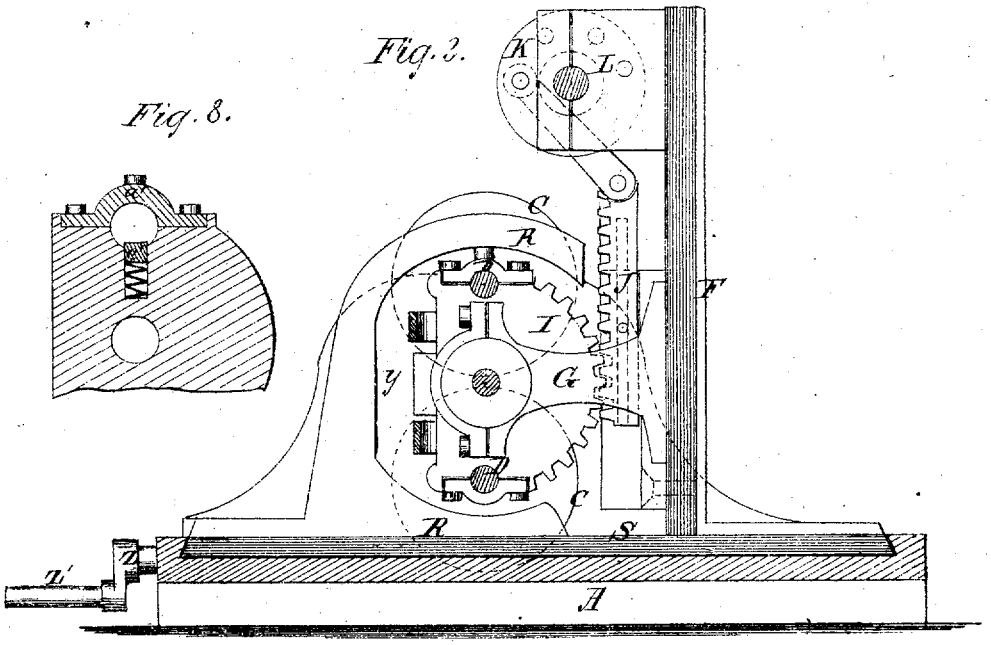
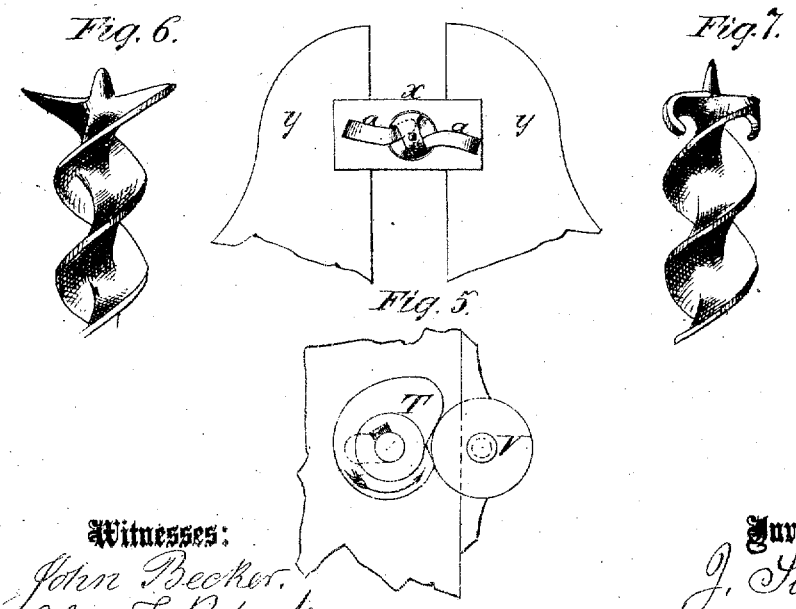
Witnesses:
John Becker.
Alex. F. Roberts
Inventor:
J. Swan
PER Munn & Co.
Attorneys.
AM. PHOTO-LITHOGRAPHIC CO. N.Y. (OSBORNE'S PROCESS.)

UNITED STATES PATENT OFFICE.

JAMES SWAN, OF SEYMOUR, CONNECTICUT.

IMPROVEMENT IN MACHINES FOR BENDING THE LIPS OF AUGER-BITS.

Specification forming part of Letters Patent No. 100,816, dated March 15, 1870; reissue No. 4,517, dated August 15, 1871.

*To all whom it may concern:*

Be it known that I, JAMES SWAN, of Seymour, in the county of New Haven and State of Connecticut, have invented a new and useful Improvement in Machine for Forging Auger-Bits by Means of Rolls; and I do hereby declare that the following is a full, clear, and exact description thereof, which will enable others skilled in the art to make and use the same, reference being had to the accompanying drawing forming a part of this specification.

This invention relates to the manufacture of auger-bit lips by machinery; and consists in certain improvements thereon, which will be more particularly specified hereinafter.

Figure 1:
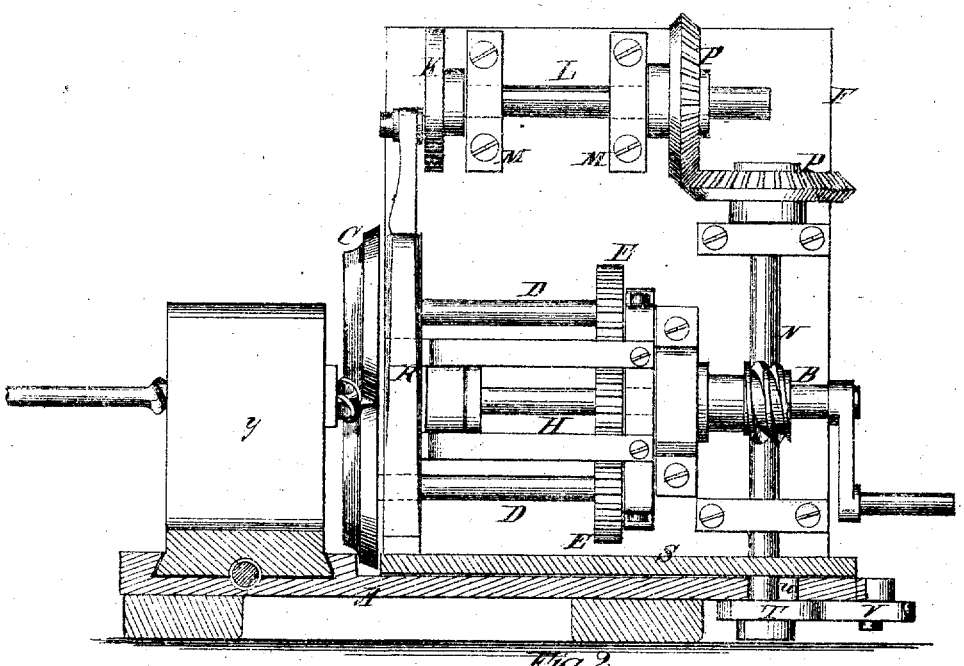
Figure 2:
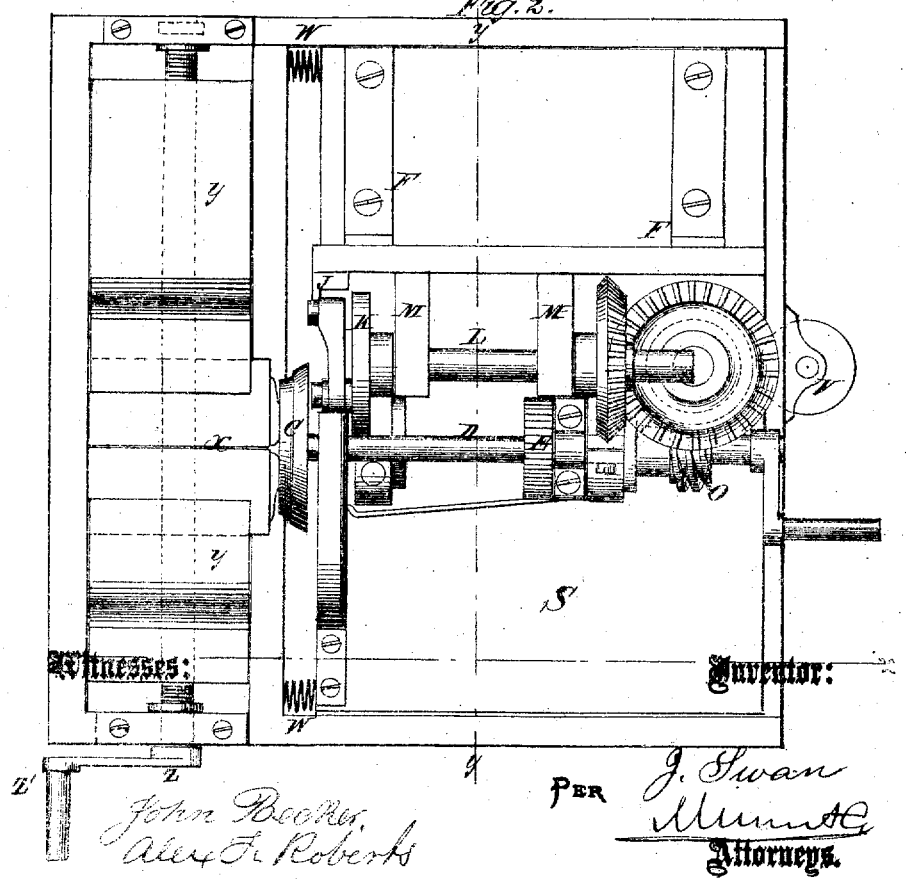

In the accompanying drawing, Figure 1, Sheet I, represents a sectional side elevation of the machine, the section being through the line *x x* of Fig. 2. Fig. 2, Sheet I, is a top or plan view. Fig. 3, Sheet II, is a vertical cross-section of Fig. 2 through the line *y y*. Fig. 4 is a face view of the bit-holder, showing the horn-like attachment on each of its sides. Fig. 5 represents the cam-motion by which the forming-rolls and sliding base-plate are made to approach toward and recede from the bit-holder. Fig. 6 represents the form of the lips of the bit before the bit enters the machine. Fig. 7 represents the form of the bit after it has been operated upon by the machine. Fig. 8 is a vertical section of a portion of the head or block, in which the shafts carrying the forging-rollers have adjustable spring bearings.

Similar letters of reference indicate corresponding parts.

In order that any boring-bit may properly work in wood, it is necessary that the lips should be "sheared" or beveled backward from their cutting-edges toward the pod, both on their upper faces and on their sides. This perfection of form is technically called the "clear," and without it the implement will bind in the wood and be inoperative.

By no process of hand-forging, nor by any forging apparatus hitherto invented, can this clear be given with anything like sufficient accuracy of proportion to obtain a good result. Such result has hitherto been obtained only by the use of expensive tools and the services of very skillful workmen. The mouth or under side of the lips is required to be flaring, the metal being extremely thin at the cutting-edge and gradually increasing in thickness through the throat until it reaches the pod. This configuration is not obtained by hand-forging, nor has it been obtained by any hitherto invented machinery, for the reason that the inner sides of the lips have never been formed by projections from crimp-dies. Now, such projections issuing from points on the dies lying inside the throat of the bit can never be made large enough at their extremities to give the proper amount of flare to the mouth. If they were large enough they could not be extricated from the bit.

By my improvement both the clear and the proper amount of flare in the mouth of the bit are obtained in one operation. The horn-like attachments upon the ends of the dies or bit-holder are, at their extremities over which the lips are to be turned, entirely separate and detached from the dies. When, therefore, the dies are in the act of closing, these horns move toward one another from opposite sides, and pass one another behind the lips and upon opposite sides of the spur or axis of the blank, in which position they remain until after the lips have been bent over and molded upon and partly around the horns and otherwise completed by the action of the rolls, after which it is only necessary to separate the dies by means of the screw to withdraw the horns from the mouth of the bit. The motions necessary for performing the various operations will be understood by more particular reference to the drawing.

A is the bed-plate of the machine. B is the driving-shaft. C C represent the forming-rollers. D D are the shafts, upon the ends of which these rollers are firmly keyed or fastened. E E are gear-wheels on the shafts D. These shafts have spring-bearings in the heads, which oscillate or are given a partial revolution on the driving-shaft B back and forth. It will be seen that by means of the cap *a'*, Fig. 8, and the springs and bearing-pieces C' the shaft D may be adjusted toward or from each other. Said shaft rests on the bearing-pieces C', so that on the rotation of the heads the forging-rollers may be brought slightly nearer each other at the desired point by means of the guides R, in order to operate on the blank. The boxes of the driving-shaft B are stationary in brackets projecting from the vertical plate F, one of which brackets is seen in the cross-section, Fig. 3, Sheet II, marked G. H is a gear-wheel on the driving-shaft, which meshes into the spur-wheels on shafts and drives the rollers. An oscillating motion or reciprocating partial revolution is given the rollers by means of the cogs on the circular side I of one of the heads to which the roller-boxes are attached and the rack J which engages therewith, seen in Fig. 3. This rack receives a reciprocating vertical motion from a crank-pin in the disk-wheel K, which is on the end of the shaft L. This shaft is confined to the plate F by the bracket-boxes M N. N is a vertical shaft, which is revolved by the worm-gear O, and it revolves the shaft L by means of the miter-gear wheels P P. R R represent circular guides, so formed or constructed as to prevent the rollers spreading from each other to an undue extent. The resistance offered by the metal between them serves to spread them, while the guides force them toward each other. Any required flexibility may be given by means of spiral springs operating on the boxes in which their respective shafts revolve.

All the operating parts of the machine which we have so far described are supported on the sliding plate or platform S. This plate is dovetailed into the bed-plate A, and is allowed to slide back and forth so as to carry the forming-rollers toward and from the bit-holder. This motion is given in one direction by means of the cam T on the end of the upright shaft N beneath the bed A, seen in Fig. 1. The shaft passes through the bed in a slot, *u*, as seen in the drawing, and the cam acts against the stationary friction-roller V. The action of the cam throws the plate, and consequently the rollers C, toward the bit-holder or forward. The back motion is produced by means of springs W, seen in Fig. 2. X represents the bit-holder in two parts attached to the movable jaws *y y*. These jaws are operated by a right-and-left-handed screw, *z*, so that the parts of the bit-holder *x* are simultaneously separated or drawn together by revolving the screw. This is done by means of the crank *Z'*.

By the above arrangement of the jaws so as to be simultaneously operated the bit is accurately centered, and the bit will consequently be centrally pointed and the lips thereof will be equally dressed. The accurate centering of the bit is a matter of great importance, as any inaccuracy, such as that arising from the use of the old plan of having the jaws moved separately, causes the point to be produced out of center, and otherwise spoils the bit and work. The jaws *y y* slide in a dovetail recess in the bed A, as seen in Fig. 1.

The heated blank, as seen in Fig. 6, is properly secured in the bit-holder by means of the jaws *y y*, and the machine is set in motion by power applied to the driving-shaft B. For a right-hand bit the machinery turns to the left, and vice versa. The forming-rollers are advanced by means of the cam, and commence to roll the heated metal before them in the direction of the extremities of the lips, the interior shape of the mouth of the bit being preserved by the anvil-horn extremities of the two horn-like attachments to the parts of the bit-holder. These attachments or projections are marked *a a*. The rolls also commence their oscillation, and as they oscillate the cam further advances them, and causes them to impinge more and more on the face of the bit, which is thereby sheared or beveled more and more from the point of first contact. This shearing progresses during the half oscillation of the rolls, and until a perfect clear is obtained. The rolls then perform their return movement, produced by the springs, but governed by the cam. The rolls, by the reverse action of the cam and of the guides, recede from each other and from the bit-holder, and do not mar or injure what they have accomplished in giving clear to the bit, but simply thin away the metal until all that was superfluous in the stock is rolled out beyond the point where the cutting-edges of the bit terminate. The configuration of the mouths of the bit—*i. e.*, the particular curvature of the inner surface of the lips—is due to the projections on the dies; but the curvature of the exterior surface of the lips, and the relations otherwise of that surface with the inner surface, is due to the particular construction of the rolls and their oscillatory, translating, and rotary movements, as well as to the projections. Thus the rolls, in their movement forward, effected by cam T, first come in contact with the extremities of the bits and gradually turn them inward, the particular curvature taken by them being governed by the scotia-shaped depressions in the rolls. After the rolls have receded from the blank the machine is stopped and the bit is removed. Nothing remains to be done but to remove the superfluous metal from the points beyond the cutting-edges. A bit is then obtained with a clear, and with sufficient flaring mouths, from this operation alone.

From what has already been said it will have become apparent that the action of the rolls upon the bit is due to four different but reciprocally-operating causes, viz., the rectilinear movement of the rolls to and from the bit, the rotation of the rolls separately around their axes, the oscillating movements of the rolls around the shaft B, and a slight movement of approach and recession of the rolls to and from one another; the first bringing the rolls up to and forcing them against the bit in readiness to act, the second causing them to bend the lips down against the die *x*, and the third and fourth gradually changing the positions of the rolls in relation to one another and to the spur and lips of the bit, and co-operating with the first and second to mold said spur and the external surfaces of the lips to the forms desired and to produce the necessary clear. It is obvious that the oscillating movements of the rolls might be dispensed with by imparting a slight rotating movement to the auger-blank or to the dies by which it is held; but I prefer to oscillate the rolls as described; and it is also obvious that, for bending, thinning, and beveling the lips of an auger, a pair of rolls with mechanism to rotate them, with a cam to force them up to and against the bit, and a spring to withdraw them from said bit, may of themselves be sufficient in many cases, and also that rolls of different configurations and of a number greater than two may be used for said purposes.

I desire it to be distinctly understood that I do not confine myself to the shape, number, or manner of using them for this purpose.

The advantage of this machine over any machine or device hitherto adopted for the purpose is, the cutting-lips are brought to the proper shape and form in the most perfect and expeditious manner.

Having thus described my invention, I claim as new and desire to secure by Letters Patent—

1. The combination, with jaws for holding the blank, of an operating former consisting of a pair of rolls, each suitably molded in the face and edge, and mechanism to rotate said rolls separately, to partially revolve them together around a common axis, to impart to them rectilinear movements toward and from the holding-jaws, and movements of approach and recession toward and from one another, substantially as described.

2. The combination, with the holding-jaws *x*, of the rotary forming-rolls C and mechanism to impart to said forming-rolls rectilinearly reciprocating movements toward and from the jaws, substantially as specified.

3. The combination, with the holding-jaws *x*, of the rotating forming-rolls C and mechanism to impart to said forming-rolls rectilinearly reciprocating and oscillating movements, substantially as described.

4. The combination, with the holding-jaws *x*, of the rotary forming-rolls C, the yielding bearings and supports of said rolls, mechanism to impart to said rolls rectilinear reciprocating movements toward and from the jaws, and the guide-yoke R, as specified.

5. The combination, with the holding-dies *x*, of the rotary forming-rolls C, movable platform S, cam T, and springs W, as specified.

6. The combination, with the holding-jaws *x*, of the right-and-left-handed screw to equally and simultaneously move said jaws to clamp and unclamp the blank and the rotary forming-rolls C, as specified.

7. The combination, with the holding-jaws *x*, of the horn-like projections *a*, of the form described and shown, attached to and projecting from said jaws, as specified.

JAMES SWAN.

Witnesses:
T. B. MOSHER,
GEO. W. MABEE.